(12) United States Patent
Kreuzer et al.

(10) Patent No.: US 6,365,875 B1
(45) Date of Patent: Apr. 2, 2002

(54) HEATABLE STEERING WHEEL

(75) Inventors: Martin Kreuzer, Kleinwallstadt; Michael Lehmann, Aschaffenburg, both of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/498,174

(22) Filed: Feb. 4, 2000

(30) Foreign Application Priority Data

Feb. 5, 1999 (DE) ..................................... 299 02 044 U

(51) Int. Cl.$^7$ ................................................. B62D 1/06
(52) U.S. Cl. ........................ 219/204; 428/66.6; 74/552
(58) Field of Search ........................ 428/66.6; 219/204; 74/552

(56) References Cited

U.S. PATENT DOCUMENTS 4,631,976 A    12/1986  Noda et al.
4,640,340 A     2/1987  Noda et al.
5,072,093 A  * 12/1991  Scheuerer .................... 219/204
5,840,144 A    11/1998  Schumacher et al.

FOREIGN PATENT DOCUMENTS

| DE | 3438266  | 5/1985  |
| DE | 3906576  | 6/1990  |
| EP | 0985590  | 3/2000  |
| JP | 10287247 | 10/1998 |

* cited by examiner

Primary Examiner—Alexander S. Thomas
(74) Attorney, Agent, or Firm—Tarolli, Sundheim, Covell, Tummino & Szabo L.L.P.

(57) ABSTRACT

A heatable steering wheel with electric heating wires on a wheel rim is provided. The heating, wires are covered by a casing. The casing consists of a support layer that has good thermal conductivity and of an externally applied layer of veneer wood.

10 Claims, 2 Drawing Sheets

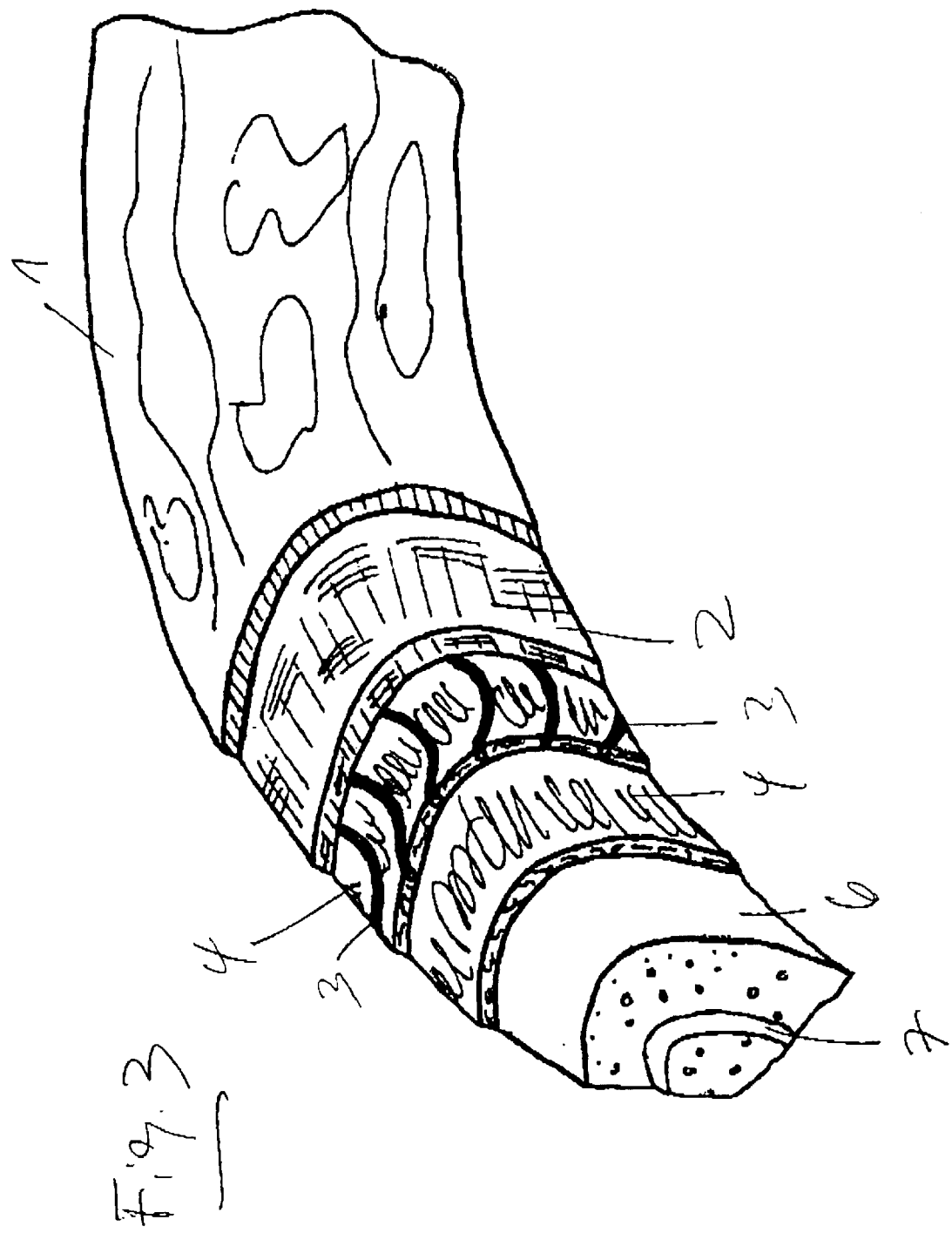

HEATABLE STEERING WHEEL

The present invention relates to a heatable steering wheel with electric heating wires arranged on a steering wheel rim and a casing covering the heating wires.

BACKGROUND OF THE INVENTION

Within attempts to improve comfort for motor vehicle users, inter alia heatable steering wheels have been offered, in order to be able to bring the most important grip region of the steering wheel, i.e. the steering wheel rim, to a haptically pleasant temperature as quickly as possible. As quickly as possible means, here, quicker than is possible with the conventional heating devices for the interior of motor vehicles. The heating wires can be connected with the electrical supply system of the motor vehicle via the ignition switch of the motor vehicle or in a preprogrammed manner, the heating output being monitored and regulated in a known manner using temperature sensors.

The steering wheel casing in such heatable steering wheels frequently consists of leather which is placed around the steering wheel rim over the heating wires and is sewn along an edge. One can also arrange leather strips, provided with heating wires, on the steering wheel rim and sew them to each other along an edge. The leather casing here has the purpose of concealing the heating wires visually, of protecting the hands of the motor vehicle user from a direct contact with the heating wires which are heated to 60 to 70° C. and to distribute the heat, emitted from the heating wires, to greater surface regions. It is obvious that between the latter functions and the basic problem of providing a pleasantly tempered steering wheel as quickly as possible, a contradiction exists for which there can be no optimum solution but rather only a compromise matched to the respective case of application.

In top class vehicles, for which so-called wooden steering wheels are offered to an increasing extent, hitherto an acceptable compromise has been missing for the arrangement of heating wires. In steering wheels in which the metallic steering wheel skeleton has a casing of solid wood in the rim area, the arrangement of heating wires is not possible. "Wooden steering wheels", however, are also understood to mean embodiments in which the steering wheel skeleton is encased with half shells of laminate wood in the rim area, onto which a layer of veneer wood is applied externally, For reasons of manufacturing technique, such half shells together with the externally applied veneer wood must have a wall thickness of at least 3 mm, which owing to the poor thermal conductivity of the wood is too much for the rapid heating of the steering wheel rim which is aimed for. With heating wires arranged beneath a wood layer at least 3 mm thick, the outer layer of the steering wheel rim can scarcely be brought more quickly to the desired temperature than is possible via the conventional heating arrangements for the interior of the vehicle. For these reasons, "heatable wooden steering wheels" have hitherto not been developed and offered.

BRIEF SUMMARY OF THE INVENTION

The invention overcomes the above-mentioned difficulties and proposes a "heatable wooden steering wheel" in which the surface of the steering wheel rim can be brought to a haptically pleasant temperature at a similar speed to steering wheel rims encased in leather.

According to the invention the steering wheel casing consists of a support layer having good thermal conductivity and of a layer of veneer wood lying externally and connected with the support layer.

Hitherto, one proceeded from the assumption that the arrangement of veneer wood in the area of the steering wheel rim requires a support layer of wood, because otherwise a sufficient adhesive strength could not be achieved between the support layer and the externally applied veneer wood. However, it has been found that veneer wood can also be reliably connected with support layers which consist of material having good thermal conducting properties and which with a desirable small thickness for the passage of heat have a sufficient mechanical strength. According to the invention, the support layers preferably consist of glass fiber-reinforced plastic, into which in addition materials having good thermal conducting properties such as molybdenum disulphide and carbon black are embedded.

BRIEF DESCRIPTION OF THE DRAWINGS

Further details of the invention are explained more closely with reference to the drawings. In the drawings:

FIG. 3 is a perspective view showing the structure of the steering wheel rim

DETAILED DESCRIPTION OF THE PREFERRED EMBODIMENTS

Figure 1:
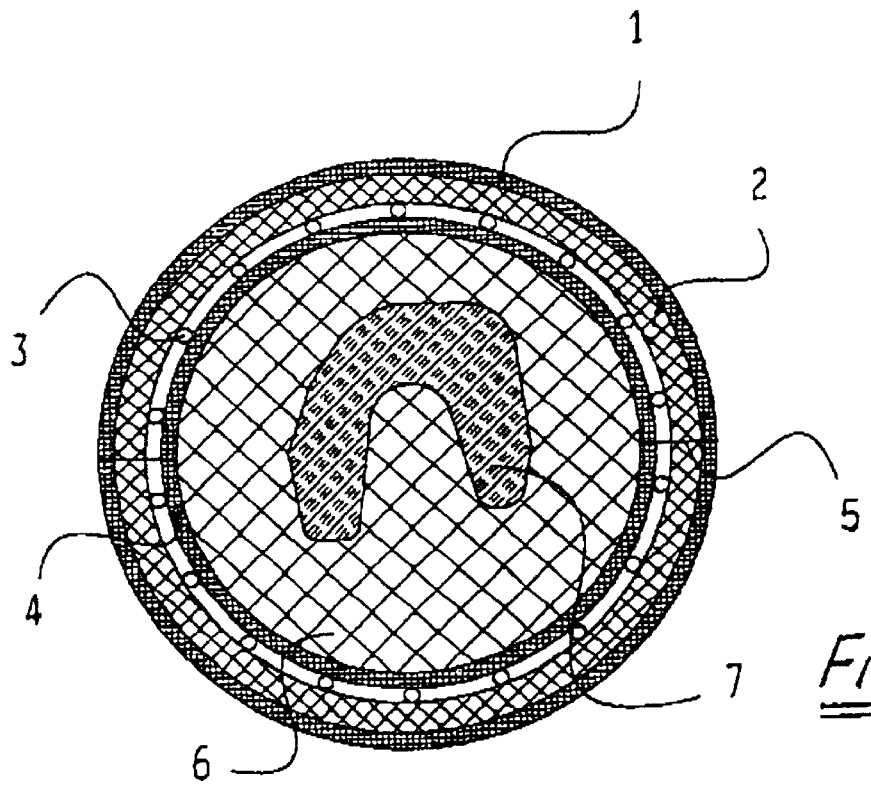
FIG. 1 shows a cross-section through a steering wheel rim according to a first embodiment.

In the diagrammatic sectional illustration of FIG. 1, not to scale with regard to the wall thickness, the steering wheel rim consists of a metallic steering wheel skeleton 7 which is coated in a known manner with a foam plastic, preferably of polyurethane on of an expandable polypropylene. On this base steering wheel rim 6, 7 a fleece layer 4 is arranged, which serves for fixing the heating wires 3. Then following the heating wires 3 to the exterior is the support layer 2 of glass fiber-reinforced plastic, and finally the outermost layer of veneer wood, designated by 1. In the illustrated example embodiment, the casing for the steering wheel rim 6, 7 including the heating wires 3 and the fleece layer 4 consists of prefabricated half shells, which are glued to each other along the joint surfaces 5.

Figure 2:
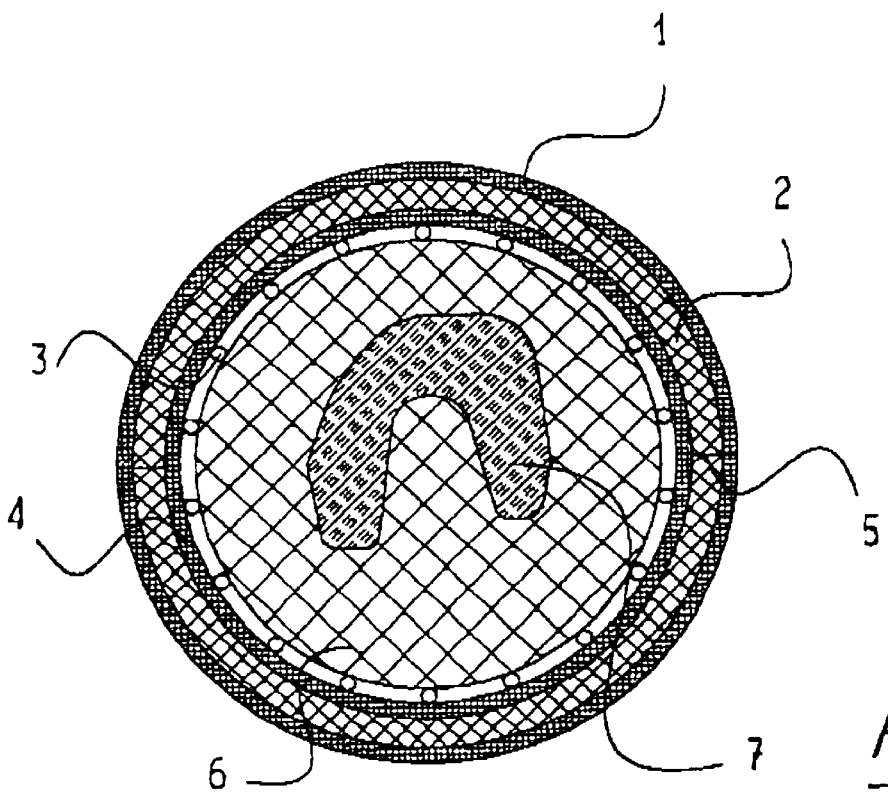
FIG. 2 shows a cross-section through a steering wheel rim according to a second embodiment.

The same reference numbers are used for the embodiment according to FIG. 2. This embodiment differs from that according to FIG. 1 in that the heating wires 3 are applied directly on the base steering wheel rim 6, 7 and are fixed by means of the fleece layer 4. The steering wheel casing consists in turn of prefabricated half shells which here, however, only surround the support layer 2 and the layer of veneer wood 1 lying externally and are glued or bonded to each other along the joint surfaces 5. The embodiment according to FIG. 2 has an advantage in that the heating wires are not distributed onto two half shells and do not have to be connected in a relatively costly manner with the electrical mains power supply, but rather as a whole are arranged directly on the steering wheel rim 6, 7 and are able to be wired more simply. On the other hand, the externally applied fleece layer 4 for fixing the heating wires 3 forms an additional thermal conductivity resistance.

Tests have shown that with the structure of the steering wheel casing according to the invention, heating-up times can be achieved which are comparable with those of the heatable steering wheels encased with leather, because the thermal conductivity of the support layer according to the invention is substantially better than that of wood previously used. In any case, through a suitable selection of material and measurement of the thickness soft the support layers for the steering wheel rim, heating-up times can be achieved which are substantially lower than if the steering wheel had to be heated up via the heating devices for the interior of the motor vehicle.

The following materials are preferred for the support layer 2: ABS (acrylnitride butadiene styrene copolymers), polycarbonate, polyamide, preferably each with a fiber glass reinforcement. Glass fibers impregnated with melamine resin, epoxy resin or polyester resin can be used as well. A laminated structure of glass fiber layers and wood layers may also be appropriate.

To improve the thermal conductivity of the support layer 2, the layer is charged with materials such as molybdenum disulphide, carbon black or metallic particles or fibers.

The fleece layer preferably consists of polyester, polyamide, polypropylene or sisal fibers.

The heating wires 3 are preferably produced from alloys such as CuNi and CrNi.

What is claimed is:

1. A heatable steering wheel having a wheel rim, electric heating wires arranged on the wheel rim and a casing covering the heating wires, wherein said casing consists of a support layer and of an externally applied layer of veneer wood, and wherein said support layer consists of a plastic reinforced with fibers, said heating wires being embedded in a fleece layer.

2. The steering wheel according to claim 1, wherein said fleece layer is made of one of the following: polyester, polyamide, polypropylene and sisal.

3. The steering wheel according to claim 1, wherein materials selected from one of: molybdenum disulfide, carbon black, metal particles, or metal fibers are incorporated in the support layers.

4. A heatable steering wheel having a wheel rim, electric heating wires arranged on the wheel rim and a casting covering the heating wires, wherein said casing consists of a support layer and of an externally applied layer of veneer wood, and wherein said support layer consists of a laminated structure of glass fiber layers and wood layers.

5. A heatable steering wheel having a wheel rim, electric heating wires arranged on the wheel rim and a casing covering the heating wires, wherein said casing consists of a support layer and of an externally applied layer of veneer wood, and wherein said support layer consists of a material selected from the following: ABS, polycarbonate, polyamide, said heating wires being embedded in a fleece layer.

6. The steering wheel according to claim 5, wherein said fleece layer is made of one of the following: polyester, polyamide, polypropylene and sisal.

7. A heatable steering wheel having a wheel rim, electric heating wires arranged on the wheel rim and a casing covering the heating wires, wherein said casing consists of a support layer and of an externally applied layer of veneer wood, and wherein said support layer consists of glass fibers impregnated with one of the following: melamine resin, epoxy resin and polyester resin, said heating wires being embedded in a fleece layer.

8. The steering wheel according to claim 7, wherein said fleece layer is made of one of the following: polyester, polyamide, polypropylene and sisal.

9. A heatable steering wheel having a wheel rim, electric heating wires arranged on the wheel rim and a casing covering the heating wires, wherein said casing consists of a support layer and of an externally applied layer of veneer wood, and wherein said support layer consists of glass fibers impregnated with one of the following: melamine resin, epoxy resin and polyester resin, the glass fibers being provided in the form of a fleece layer.

10. A heatable steering wheel having a wheel rim, electric heating wires arranged on the wheel rim and a casing covering the heating wires, wherein said casing consists of a support layer and of an externally applied layer of veneer wood, the casing with the support layer and the veneer wood being provided as a pair of prefabricated half shells bonded to each other, the support layer being a laminated structure of glass fiber layers and wood layers.

* * * * *

UNITED STATES PATENT AND TRADEMARK OFFICE
CERTIFICATE OF CORRECTION

PATENT NO. : 6,365,875 B1
DATED : April 02, 2002
INVENTOR(S) : Martin Kreuzer and Michael Lehmann It is certified that error appears in the above-identified patent and that said Letters Patent is hereby corrected as shown below:

Column 3,
Line 38, after "a", change "casting" to -- casing --.

Signed and Sealed this

Eleventh Day of February, 2003

JAMES E. ROGAN
*Director of the United States Patent and Trademark Office*